Aug. 14, 1956  H. LEWIS  2,759,140
RECTIFIER CIRCUIT
Filed July 22, 1955

*INVENTOR.*
HERBERT LEWIS.
BY Clark & Ott
ATTORNEYS.

United States Patent Office 2,759,140
Patented Aug. 14, 1956

2,759,140

RECTIFIER CIRCUIT

Herbert Lewis, Bronx, N. Y., assignor to Beatrice Lewis, New York, N. Y.

Application July 22, 1955, Serial No. 523,645

5 Claims. (Cl. 321—27)

This invention relates to a rectifier circuit which converts power from a three phase alternating supply to a direct current. It has particular reference to a circuit which employs three rectifier bridges and two secondary transformer windings to produce a stable direct current output having a very small alternating modulation.

Conventional rectifier circuits generally employ a single phase primary and a split secondary, the center point of the secondary being connected to one terminal of the direct current output circuit. The output circuit of such a system contains a considerable percentage of alternating current power having a frequency of twice the supply frequency which is difficult to filter and in many cases produces noise and unwanted modulation in the load circuit. The present invention combines two secondary circuits of a three phase primary supply with three rectifier bridges and produces a stabilized direct current in the output circuit having a frequency which is twelve times the frequency of the supply circuit. The alternating current modulation for such a circuit is only 1.6 percent of the direct current power and is easy and convenient to eliminate by means of low cost filters.

One of the objects of this invention is to provide an improved rectifier circuit which avoids one or more of the disadvantages and limitations of prior art arrangements.

Another object of the invention is to reduce the operating voltage across individual rectifier components employed in this circuit.

Another object of the invention is to increase the current flow to a direct current load.

Another object of the invention is to reduce the weight and the cost of filtering equipment used to eliminate alternating current modulation from the direct current load.

The invention comprises a three phase alternating current power supply connected to the primary of a transformer which may be arranged in either delta or Y connection. Two secondaries are provided, one delta and one Y, arranged so as to produce a six phase output. The six phase power is connected to three rectifier bridge circuits and the opposite junction points of these bridges are connected in parallel to the output direct current circuit.

One feature of the invention comprises an interphase transformer which is connected between the two secondary windings and increases the efficiency and the regulation of the output voltage.

For a better understanding of the present invention, together with other and further objects thereof, reference is made to the following description taken in connection with the accompanying drawings.

Fig. 3 is a schematic diagram to show the terminal arrangements of the rectifier components as used in Figs. 1 and 2.

Figure 1:
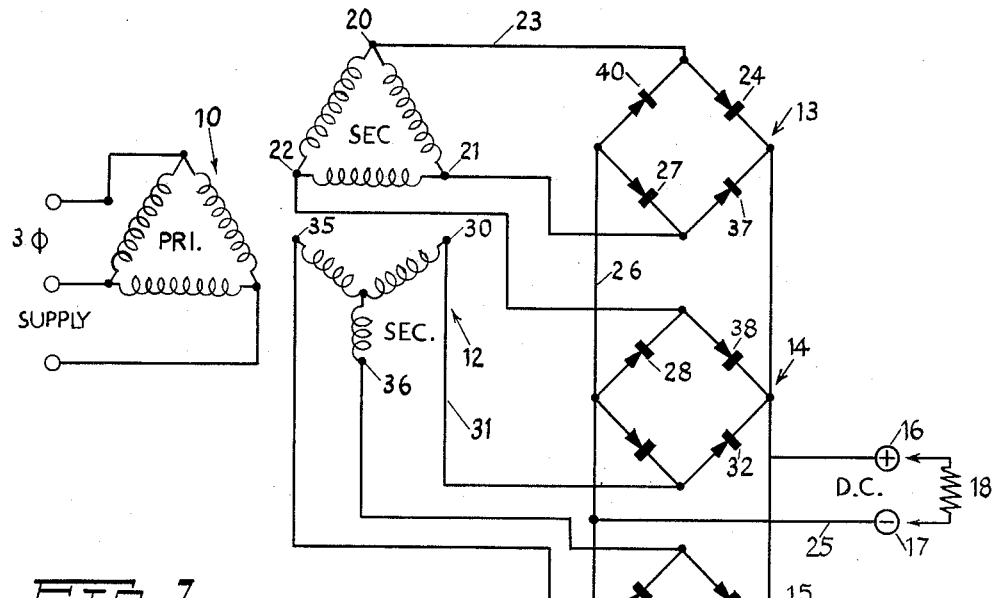
Fig. 1 is a schematic diagram of connections of one form of the rectifier circuit.
Figure 2:
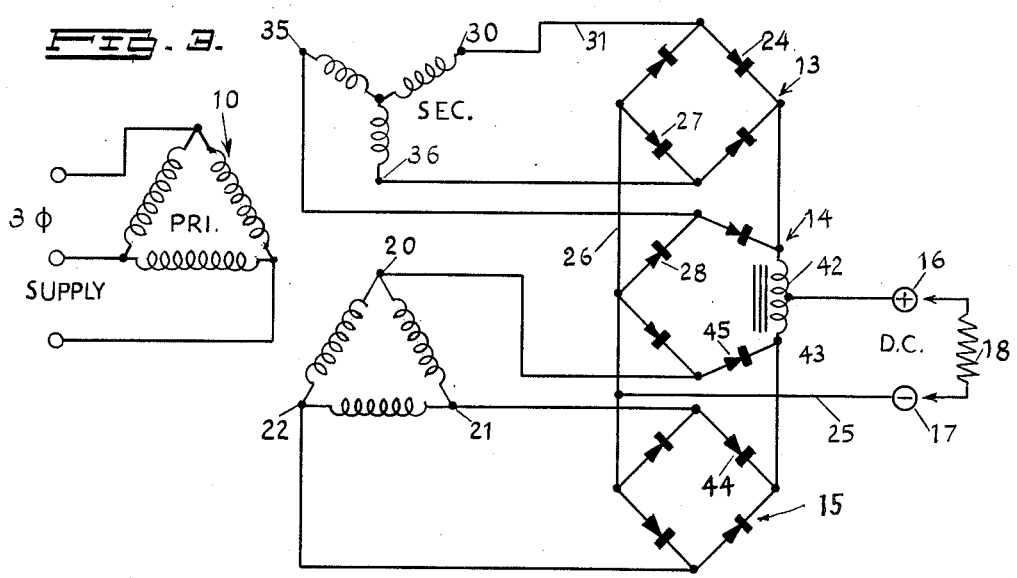
Fig. 2 is a schematic diagram of connections showing an alternate form of the invention employing an interphase transformer.

Referring now to Figs. 1 and 2, a primary winding 10 is connected to the terminals of a three phase alternating current supply. The primary windings may be arranged in either the delta or Y connection. A secondary winding 11 of the transformer is connected in delta formation and another secondary winding 12 is connected in Y formation. Secondaries 11 and 12 are arranged on the transformer core (not shown) in such manner as to produce a six phase output, each phase having a sixty degree time shift from one of the other phases. The six wires connected to each of the six secondary terminals are also connected to opposite junction points of three bridge rectifier circuits 13, 14, and 15. Each of the rectifier bridges include four arms, each having a rectifier component in series connection. The remaining opposite junction points of the three bridges are connected to direct current output terminals 16, 17, which in turn are connected to a direct current load circuit 18. Each of the rectifiers may consist of a plurality of smaller units, connected in either series or parallel.

In order to explain the operation of this circuit let it be assumed that junction points 20 on secondary 11 has attained a maximum positive voltage. At this instant junctions 21 and 22 are both negative but having a voltage which is only half the voltage of point 20. Under these conditions a current flows over conductor 23 through rectifier component 24 to terminal 16, the load 18, terminal 17 and conductor 25, over conductor 26, through rectifier components 27 and 28, to junction points 21 and 22. It will be obvious that the current divides equally between components 27 and 28 since junction points 21 and 22 have the same voltage.

When one of the terminals 30 on secondary winding 12 attains its maximum positive voltage the current path through the rectifier elements may be traced as follows: From terminal 30 over conductor 31 through rectifier 32 to terminal 16, load 18, terminal 17, conductor 25, and then through rectifier components 33 and 34 in parallel, back to terminals 35 and 36 on secondary winding 12. Terminals 35 and 36 have the same negative voltage, equal to half the voltage of terminal 30 when the latter voltage is at its maximum positive value. Similar current paths may be traced from terminals 21 and 22 on secondary winding 11 and from terminals 35 and 36 on secondary winding 12 when each terminal attains its maximum voltage value. The result is a combined flow of six positive voltage pulses through the direct current load 18 for each cycle of the three phase supply. When terminal 20 in secondary 11 attains its maximum negative potential the current flow then may be traced from points 21, 22, which are at half the value of their maximum positive voltage, through rectifier components 37, 38, to terminal 16, load 18, terminal 17, conductors 25 and 26, through rectifier component 40, over conductor 23, to terminal 20. Similar paths may be traced from the other five terminals on secondary windings 11—12 each of which produces a voltage pulse across terminals 16, 17, the combined action producing twelve pulses for each cycle of the three phase supply. If the three phase supply has a frequency of sixty cycles per second the output ripple frequency is 720 cycles per second, a frequency that is easy to eliminate by filter circuits.

The circuit shown in Fig. 2 is similar to that shown in Fig. 1 except that an inter-phase transformer 42 is included in the second bridge circuit. And an analysis of the combined voltages produced in the circuit of Fig. 1 shows that while a maximum voltage is being applied to the load circuit by one of the secondary terminals, such as 20, other terminals, such as 30 and 35 have generated voltages of lesser values and because of the characteristics of the rectifier units the voltages applied by terminals 30 and 35 produce little if any current in the output load 18. The inter-phase transformer 42 corrects this difficulty in the following manner: Let it be assumed that terminal 30 in Fig. 2 is at its maximum voltage and terminal 21 is at a voltage which is about 86 percent of its maximum. A circuit may now be traced from terminal 30 over conductor 31 through rectifier component 24, through the upper half of winding 42 to terminal 16, load 18, terminal 17, conductors 25 and 26, through rectifier components 27 and 28, back to terminals 35 and 36. The current through the upper half of transformer 42 at this time generates a voltage in the lower half of the winding which adds to the voltage produced by terminal 21 acting through rectifier 44. When terminal 30 is at its maximum voltage, terminal 21 is about 86 percent of its maximum. The addition of the voltage supplied by transformer 42 makes these two voltages substantially equal and therefore they operate in parallel without any parasitic currents flowing between windings or without blocking the flow of useful current.

From the above description it will be evident that the inter-phase transformer 42 acts as a balance coil to equalize the operating voltages and permit the circuit to operate at higher efficiency.

It will be evident from the above description that a six phase rectifier circuit has been described which operates in conformity with the characteristics of present day rectifier components to produce a rectifier efficiency considerably above that now attainable by conventional circuits.

While there have been described and illustrated specific embodiments of the invention, it will be obvious that various changes and modifications may be made in the rectifier circuit without departing from the field of the invention which should be limited by the scope of the appended claims.

What is claimed is:

1. A rectifier circuit for converting three phase alternating current to direct current comprising; a transformer having a three phase primary winding with terminals for connection to a three phase power supply; two secondary windings on said transformer arranged to produce six phase power at six output terminals; three rectifier bridge circuits, each including a rectifier component in each of four arms thereof; means for respectively connecting each of said six output terminals to each of six junctions between the other opposite junctions in said bridges and a pair of direct current terminals.

2. A rectifier circuit for converting three phase alternating current to direct current comprising; a transformer having a three phase primary winding with terminals for connection to a three phase power supply; a delta-connected secondary winding and a Y-connected secondary winding arranged to produce six phase power at six output terminals, three rectifier bridge circuits, each including a rectifier component in each of four arms thereof; means for respectively connecting each of said six output terminals to each of six junctions between two oppositely connected rectifier components; and connecting means between the other opposite junctions in said bridges and a pair of direct current terminals.

3. A rectifier circuit for converting three phase alternating current to direct current comprising; a transformer having a three phase primary winding with terminals for connection to a three phase power supply; a delta-connected secondary winding and a Y-connected secondary winding arranged to produce six phase power at six output terminals; three rectifier bridge circuits, each including a rectifier component in each of four arms thereof; means for respectively connecting each of said six output terminals to each of six junctions between two oppositely connected rectifier components; connecting means between the anodes of one set of three bridge junctions and a negative direct current terminal; and connecting means between the cathodes of the other set of three bridge junctions and a positive direct current terminal.

4. A rectifier circuit for converting three phase alternating current to direct current comprising; a transformer having a three phase primary winding with terminals for connection to a three phase power supply; a first and second secondary winding on said transformer arranged to produce six phase power at six output terminals; three rectifier bridge circuits, each including a rectifier component in each of four arms thereof; means for respectively connecting each of said six output terminals to each of six junctions between two oppositely connected rectifier components; an interphase transformer connected between two bridge arms, said interphase transformer having one terminal connected to the cathodes of the three rectifier components which transmit positive current pulses from the first secondary winding and having a second terminal connected to the cathodes of the three rectifier components which transmit positive current pulses from the second secondary winding; connecting means between a center tap on said interphase transformer and a positive direct current terminal; and connecting means between the anodes of a set of three bridge junctions and a negative direct current terminal.

5. A rectifier circuit for converting three phase alternating current to direct current comprising; a transformer having a three phase primary winding with terminals for connection to a three phase power supply; a first and second secondary winding on said transformer arranged to produce six phase power at six output terminals, three rectifier bridge circuits, each including a rectifier component in each of four arms thereof; means for respectively connecting each of said six output terminals to each of six junctions between an anode and a cathode of two rectifier components; an interphase transformer connected between two bridge arms adjacent to a plurality of rectifier cathodes, said interphase transformer connected so as to receive positive current pulses from the first secondary winding at one terminal and to receive positive current pulses from the second secondary winding at a second terminal; connecting means between a center tap on said interphase transformer and a positive direct current treminal; and connecting means between the anodes of a set of three bridge junctions and a negative direct current terminal.

References Cited in the file of this patent

UNITED STATES PATENTS

| 979,396 | Thomas | Dec. 20, 1910 |

FOREIGN PATENTS

| 477,389 | Great Britain | Dec. 22, 1937 |
| 512,906 | Great Britain | Sept. 28, 1939 |
| 734,583 | Germany | Apr. 19, 1943 |